(12) United States Patent
Jung et al.

(10) Patent No.: US 7,650,063 B2
(45) Date of Patent: Jan. 19, 2010

(54) METHOD AND APPARATUS FOR REPRODUCING AV DATA IN INTERACTIVE MODE, AND INFORMATION STORAGE MEDIUM THEREOF

(75) Inventors: Kil-soo Jung, Gyeonggi-do (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1258 days.

(21) Appl. No.: 10/897,080

(22) Filed: Jul. 23, 2004

(65) Prior Publication Data

US 2005/0036762 A1 Feb. 17, 2005

(30) Foreign Application Priority Data

Aug. 14, 2003 (KR) ............. 10-2003-0056607

(51) Int. Cl.
H04N 5/00 (2006.01)
H04N 7/00 (2006.01)
(52) U.S. Cl. ........................ 386/125; 386/95
(58) Field of Classification Search ............ 386/95, 386/46, 39, 125, 124, 105, 96, 106
See application file for complete search history.

(56) References Cited

U.S. PATENT DOCUMENTS

| 6,396,997 | B2 | 5/2002 | Moriyama et al. | |
| 6,507,696 | B1 | 1/2003 | Chung et al. | |
| 2002/0067667 | A1 | 6/2002 | Watanabe | |
| 2003/0049017 | A1 | 3/2003 | Chung et al. | |
| 2003/0182627 | A1 | 9/2003 | Chung et al. | |
| 2004/0057699 | A1* | 3/2004 | Kim et al. | 386/95 |
| 2004/0175154 | A1* | 9/2004 | Yoon et al. | 386/96 |
| 2005/0036762 | A1 | 2/2005 | Jung et al. | |

FOREIGN PATENT DOCUMENTS

KR 2002-70014 11/2002
KR 10-0565056 3/2006

OTHER PUBLICATIONS

English Abstract for KR 10-2005-0017571.
Notice of Allowance issued in Malaysian Patent Application No. PI20043256 dated Jun. 19, 2009.

* cited by examiner

*Primary Examiner*—Robert Chevalier
(74) *Attorney, Agent, or Firm*—Stein McEwen, LLP (57) ABSTRACT

A method and apparatus for reproducing audio/visual data in an Enhanced Navigation mode, and an information storage medium thereof. The information storage medium stores audio/visual data, and at least one Enhanced Navigation application including at least one Enhanced Navigation file, the Enhanced Navigation file being reproduced together with the audio/visual data, wherein the Enhanced Navigation application includes a loading information file, which includes preload information specifying the location of the Enhanced Navigation file to be buffered before reproduction of the Enhanced Navigation application, as the Enhanced Navigation file. Accordingly, it is possible to guarantee seamless reproduction of audio/visual data for an Enhanced Navigation application.

43 Claims, 9 Drawing Sheets

STARTUP FILE           LOADING INFORMATION FILE

FIG. 8B

<STARTUP.MLS>

```
<?xml version="1.0" ?>
<!DOCTYPE startup PUBLIC "-//DVD//DTD DVD-MLS 1.0//EN"
"dtd/dvdmls-1-0-content.dtd">

<startup>
   <title>Movie Name</title>
   <walledgarden href="file://dvdrom:/DVD_ENAV/garden.lst"/>
   <loadinginfo href="file://dvdrom:/DVD_ENAV/LoadingInformation.ldi">
       <condition name="lang" value="en"/>
       <condition name="profile" value="00"/>
   </loadinginfo>

<loadinginfo href="file://dvdrom:/DVD_ENAV/LoadingInformation_1.ldi"/>
</startup>
```

A — inner loadinginfo block
B — second loadinginfo line

DECLARATIVE WAY=A TAG

```
<a href="newLoadingInformation.ldi" type="text/dvd-mls+xml">
New Loading Information
</a>
```

PROGRAMMABLE WAY=API location.href="newLoadingInformation.ldi"

FIG. 11

< LoadingInformation.ldi >

```xml
<?xml version="1.0" ?>
<!DOCTYPE manifest PUBLIC "-//DVD//DTD DVD-MLS 1.0//EN"
"dtd/dvdmls-1-0-content.dtd">

<manifest>                                              C
  <entityset xml:base="file://dvdrom:/DVD_ENAV/" type="preload">
    <initial href="../chapter1/1.xhtml"/>
    <entity href="../chapter1/2.xhtml"/>
    <entity href="../chapter1/image/1.jpg"/>
    <entity href="../chapter1/image/2.png"/>
  </entityset>

<entityset xml:base="http://www.company.com/" type="postload">
    <entity href="../movie_name/chapter2/3.xhtml" type="text/dvd-ml+xml"/>
    <entity href="../movie_name/chapter2/image/3.jpg" type="image/jpg"/>
  </entityset>
</manifest>
```

METHOD AND APPARATUS FOR REPRODUCING AV DATA IN INTERACTIVE MODE, AND INFORMATION STORAGE MEDIUM THEREOF

CROSS-REFERENCE TO RELATED APPLICATION

This application claims the priority of Korean Patent Application No. 2003-56607, filed on Aug. 14, 2003, in the Korean Intellectual Property Office, the disclosure of which is incorporated herein in its entirety by reference.

BACKGROUND OF THE INVENTION

1. Field of the Invention

The present invention relates to a method and apparatus for preloading Enhanced Navigation (ENAV) data required for seamless reproduction of audio/video (AV) data in an improved navigation mode (hereinafter referred to as an 'ENAV mode'), to a buffer and reproducing the preloaded ENAV data, and an information storage medium thereof.

2. Description of the Related Art

Personal computer (PC)-based digital versatile discs (DVDs), i.e., interactive DVDs, capable of reproducing AV data in an interactive mode have been placed on the market. On an interactive DVD, AV data is recorded according to a general DVD-Video standard and data is further recorded to support an ENAV mode. The AV data recorded on the interactive-DVD can be displayed in two modes: a video mode in which AV data is displayed with the same method of displaying data recorded on a general DVD, and an ENAV mode in which the AV data is reproduced and displayed in a window defined in a markup document. When a user selects the ENAV mode, a browser built in a personal computer (PC) interprets and displays ENAV data recorded on the interactive DVD. In the ENAV mode, a screen is displayed as defined in the markup document and/or an application program while the AV data, which is selected by the user, is included in the screen. A representative example of the ENAV data is the markup document described using a markup language.

If the AV data is a movie title, a movie screen is displayed in a part of a markup screen where the markup document is interpreted and displayed, the movie screen being embedded into the markup screen, and various additional information, such as a script and plot of the movie and photos of related actors and actresses, regarding the movie is displayed in the other part of the markup screen. The additional information includes various resource files such as image files and text files. The displayed markup document enables interaction with the user. For instance, when the user clicks a button in the markup screen, the profile of an actor appearing in the movie screen can be displayed.

However, in the ENAV mode, it is required for a DVD drive installed in the PC to read ENAV data from the interactive DVD and store the ENAV data in a buffer while reading the AV data from the interactive DVD and storing it in the buffer. Accordingly, it is difficult to reproduce the AV data without a pause. That is, seamless reproduction of the AV data is not guaranteed.

SUMMARY OF THE INVENTION

The invention provides an apparatus and method for preloading ENAV data to a buffer and reproducing the preloaded ENAV data for seamless reproduction of the AV data in an ENAV mode using the ENAV data, and an information storage medium thereof.

According to an aspect of the invention, there is provided an information storage medium comprising AV data; and at least one ENAV application including at least one ENAV file, the ENAV file being reproduced together with the AV data, wherein the ENAV application includes a loading information file, which includes preload information specifying the location of the ENAV file to be buffered before reproduction of the ENAV application, as the ENAV file.

The loading information file may further include post load information that specifies the location of the ENAV file to be buffered during reproduction of the ENAV application.

The loading information file may be linked to a startup file, linked to an ENAV file constituting a different ENAV application, or designated through an API recorded in an ENAV file constituting a different ENAV application.

According to an aspect of the invention, there is provided a method of reproducing AV data in an ENAV mode, the method including reading a loading information file; parsing the loading information file; interpreting the verified loading information file and transmitting preload information, which specifies the location of an ENAV file to be preloaded, to a buffer manager; and the buffer manager controlling an ENAV buffer to preload ENAV files before reproduction of a related ENAV application, based on the received preload information.

The method may further include generating a preload trigger after completing the preloading of the ENAV file.

The method may further include reproducing the related ENAV application using buffered ENAV files and displaying related AV data in an ENAV mode.

Reproducing the related ENAV application may further include first parsing an initial ENAV file and then parsing other ENAV files, and creating a document object model tree and interpreting and executing the document object model tree according to a document life cycle.

Interpreting the verified loading information file may further include transmitting post load information, which specifies the location of an ENAV file to be post loaded, to the buffer manager.

According to another aspect of the invention, there is provided a reproducing apparatus including a reader that reads AV data from a disc, an AV reproducing engine that decodes the AV data read by the reader, and an ENAV engine that interprets and executes ENAV files from the disc using the reader and allows the ENAV files to be displayed together with the AV data decoded by the AV reproducing engine. The ENAV engine preloads ENAV files required for seamless reproduction of the AV data as the ENAV files, based on preload information recorded in a loading information file.

The ENAV engine may include an ENAV buffer to which the ENAV files are preloaded, a buffer manager that controls the ENAV buffer based on the preload information, a parser that verifies the loading information file, an interpreter that interprets the preload information from the verified loading information file, and an interface handler that transmits the preload information from the interpreter to the buffer manager.

The buffer manager may produce and output a preload trigger, which indicates completing of the preloading of the ENAV files, to the interface handler after the preloading. The interface handler may convert the preload trigger into an event and transmit the event to the interpreter. After receiving the event, the interpreter may instruct the parser that an initial ENAV file among ENAV files buffered to the ENAV buffer should be first parsed and then the other ENAV files should be buffered to the ENAV buffer.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
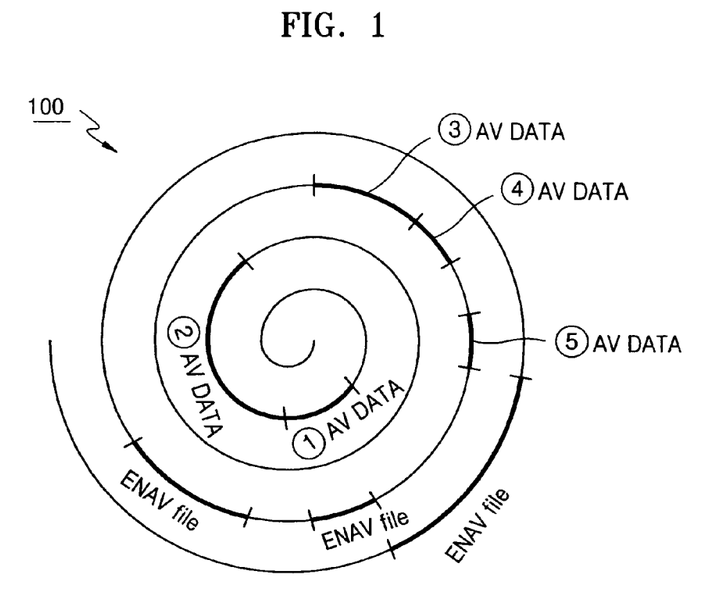
FIG. 1 is a schematic view of a disc on which audio/video (AV) data is recorded, according to an aspect of the invention.

FIG. 1 is a schematic view of a disc 100 on which audio/video (AV) data is recorded, according to an aspect of the invention. Referring to FIG. 1, ENAV data is recorded on the disc 100 to reproduce the AV data in an ENAV mode, the AV data being recorded as Motion Picture Experts Group (MPEG) bit streams in the tracks of the disc 100 and ENAV files including the ENAV data further being recorded. The ENAV file includes a markup document, image files, animation files, and sound files that are linked to the markup document, reproduced and displayed together with the markup document. It is understood that, the markup document includes one of the following: (i) a document described using a markup language, such as an Extensible HyperText Markup Language (XHTML) or a Synchronized Multimedia Integration Language (SMIL), (ii) a document described using a program language, such as a script language, which is linked to or embedded with a program code, and (iii) Cascading Style Sheets (CSS) that define the style of the markup document. That is, the ENAV file not only acts as an application required to reproduce the AV data in the ENAV mode but also provides additional contents that are displayed together with the AV data.

Figure 2:
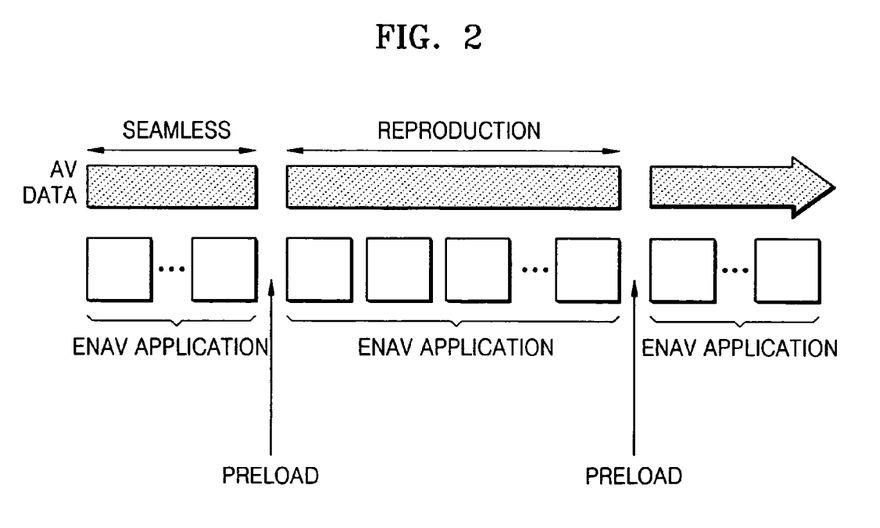
FIG. 2 is a diagram illustrating the relationship between the AV data and ENAV data recorded on the disc of FIG. 1 for seamless reproduction of the AV data in an ENAV mode.

FIG. 2 is a reference diagram illustrating the relationship between the AV data and ENAV data recorded on the disc 100 of FIG. 1 for seamless reproduction of the AV data in an ENAV mode. Referring to FIG. 2, ENAV applications correspond to related AV data and provide a seamless reproduction of the AV data. An ENAV application indicates at least one group of ENAV files. In other words, preloading of a corresponding ENAV application is required for the seamless reproduction of the AV data. Here, the preloading denotes reading a necessary ENAV application from the disc 100 and storing it in a buffer before reproduction of the AV data in an ENAV mode.

Each ENAV application includes a loading information file that specifies preload information, i.e., location information regarding an ENAV file that is to be buffered before a launching of a related ENAV application, wherein the preload information is necessary for the preloading of the ENAV application.

The preloading is performed for every ENAV application, such that the seamless reproduction of the AV data corresponding to each ENAV application can be guaranteed. Therefore, a producer should produce contents in which one ENAV application corresponds to a part and a chapter of a video title for the seamless reproduction of AV data, according to an user interface.

In connection with the preloading, post loading buffers a predetermined ENAV file after the launching of a corresponding ENAV application. However, the ENAV application does not always have an ENAV file to be post loaded. When post loading is required, post loading information, i.e., location information of an ENAV file to be post loaded, which is required for the post loading is further included in the loading information file.

Figure 3:
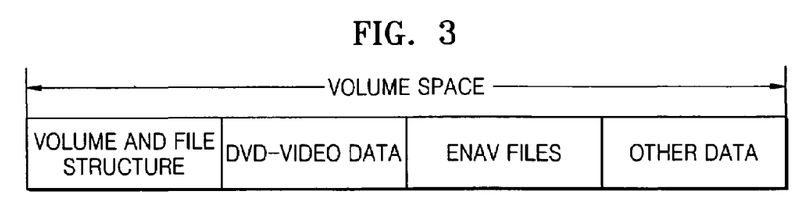
FIG. 3 is a schematic block diagram illustrating a volume of space of the disc of FIG. 1.

FIG. 3 is a schematic block diagram illustrating a volume space of the disc 100 of FIG. 1. Referring to FIG. 3, the volume space of the disc 100 includes a volume and file structure zone having information regarding disc volumes and files, a DVD-Video data zone having AV data described in a DVD-Video format, and an ENAV file zone supporting an ENAV mode.

In the DVD-Video data zone, data VIDEO_TS.IFO having reproduction control information regarding all video titles of recorded information on the disc 100, data VTS_01_0.IFO having reproduction control information regarding a first video title, and data VTS_01_0.VOB and VTS_01_1.VOB that are AV data constituting respective video titles, are recorded. The data VTS_01_0.VOB, VTS_01_1.VOB denote video titles, i.e., video objects (VOBs). Each VOB includes VOBU that is packed with a navigation pack, a video pack, and an audio pack (see a DVD-Video Standard "DVD-Video for Read Only Memory Disc 1.0" for more details).

An ENAV application having a plurality of ENAV files is stored in the ENAV file zone. That is, a startup file that is first read when the ENAV mode is selected and a markup document corresponding to a selected video title are recorded as ENAV files. It is understood that the ENAV application may have only one ENAV file.

Figure 4:
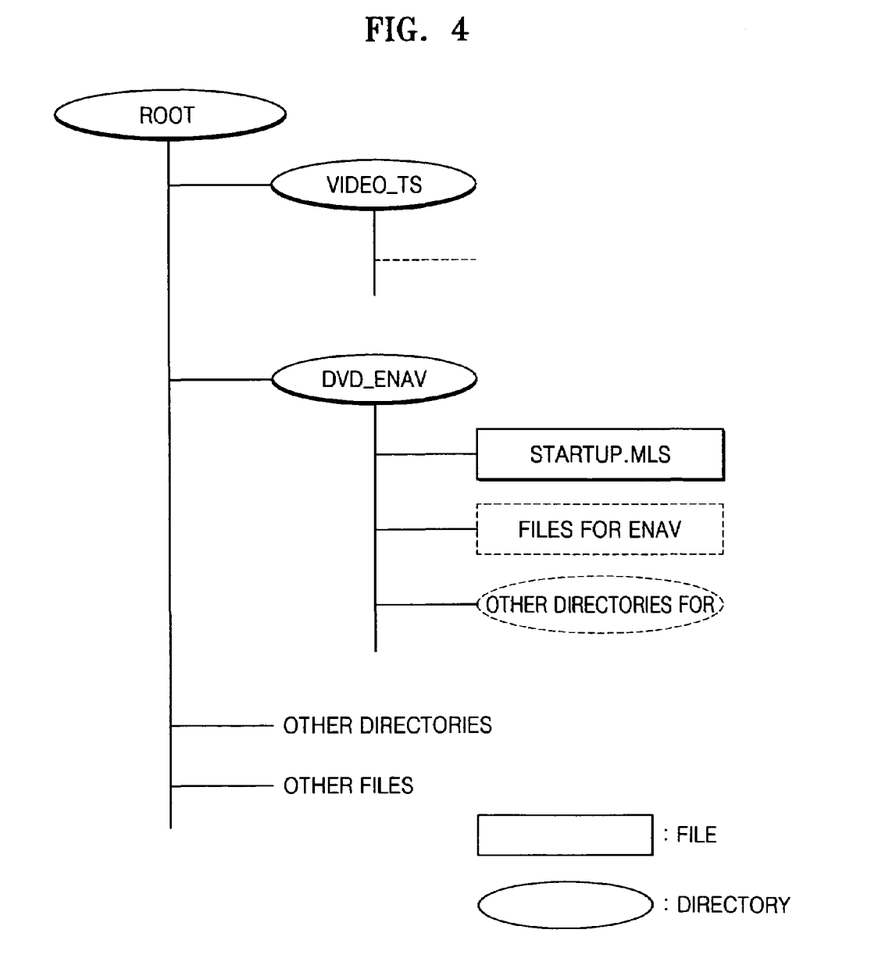
FIG. 4 illustrates a directory structure of the disc of FIG. 1.

FIG. 4 illustrates a directory structure of the disc of FIG. 1. Referring to FIG. 4, a DVD video directory VIDEO_TS and an ENAV directory DVD_ENAV for ENAV data supporting an ENAV mode each stem from a root directory.

In the DVD video directory VIDEO_TS, data VIDEO_TS.IFO, VTS_01_0.IFO, and VTS_01_0.VOB, VTS_01_1.VOB, . . . , which are described with reference to FIG. 3, are stored. In the ENAV directory DVD_ENAV, a startup file STARTUP.MLS and other ENAV files, which are also explained with reference to FIG. 3, are stored.

Figure 5:
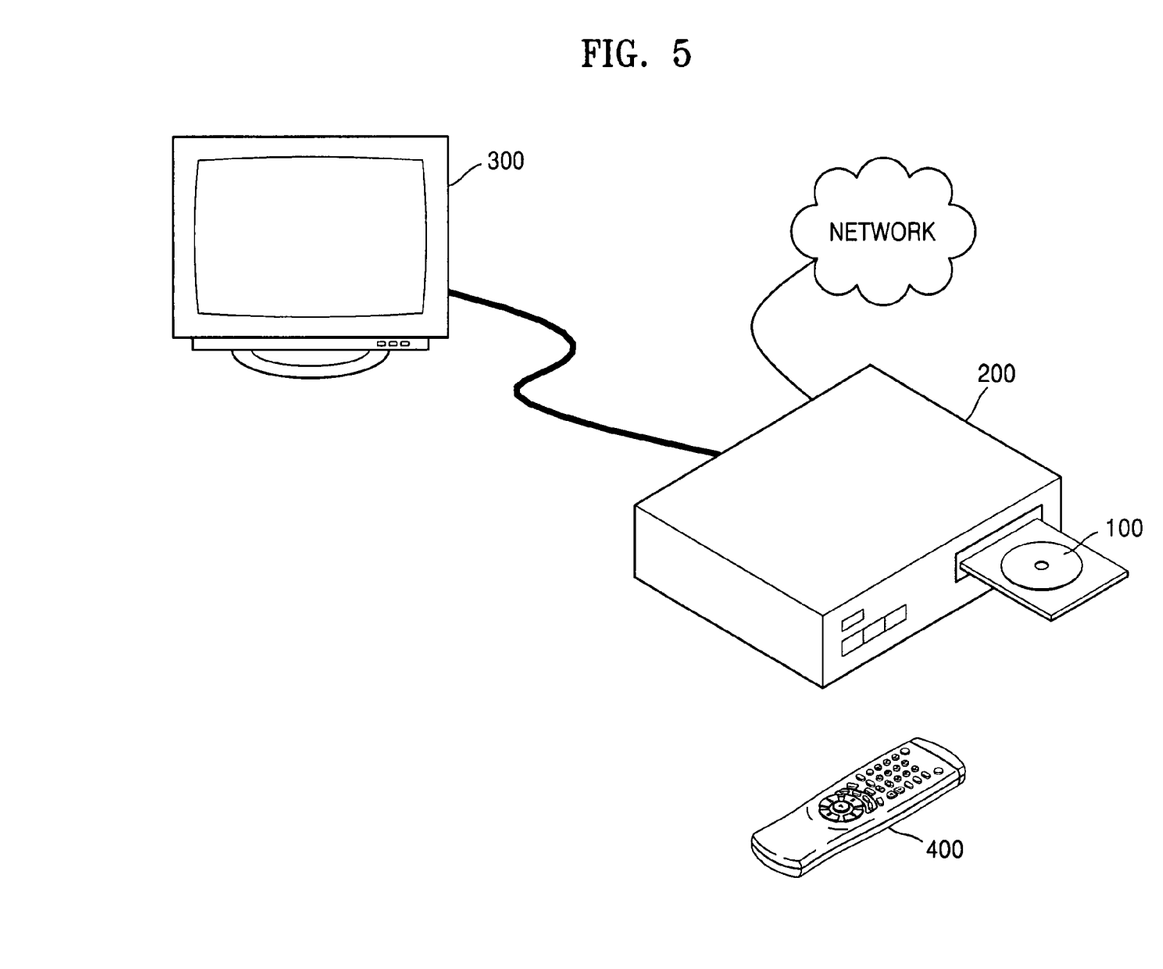
FIG. 5 is a schematic view of a reproducing system according to an aspect of the invention.

FIG. 5 is a schematic view of a reproducing system according to an aspect of the invention. Referring to FIG. 5, the reproducing system includes a disc 100, a reproducing apparatus 200, and a display device 300 that is a display according to this embodiment, and a controller 400. It is understood that the display device may be a television (TV) and the controller may be a remote control layer. The controller 400 receives a control command from a user and sends it to the reproducing apparatus 200. A DVD drive, which reads data recorded on the disc 100, is installed in the reproducing apparatus 200. When the DVD 100 is loaded into the DVD drive and the user selects an ENAV mode, the reproducing apparatus 200 reproduces AV data in the ENAV mode using a corresponding ENAV file and sends the reproduced AV data to the display device 300. Then, an AV screen made by the reproduction of the AV data and a markup screen obtained from a markup document are displayed on the display device 300. The ENAV mode indicates a mode in which the AV data is reproduced such that the AV screen is displayed in a window defined in the markup document, i.e., the AV screen is displayed while being embedded into the markup screen. Here, the AV screen indicates a screen in a display in which the AV data is reproduced and displayed, and the markup screen is a screen of the display in which the markup document is interpreted and the result of interpretation is displayed. A video mode is a mode in which the AV data is reproduced using a conventional method of reproducing DVD-Video, that is, only an AV screen obtained by reproducing AV data is displayed.

The reproducing apparatus 200 supports both the ENAV mode and the video mode. In particular, according to an aspect of the invention, a related ENAV application is preloaded from the disc 100 and preloaded ENAV files are interpreted and executed, in order to guarantee seamless reproduction of AV data.

The reproducing apparatus 200 may also access the Internet or a network to perform post loading.

Figure 6:
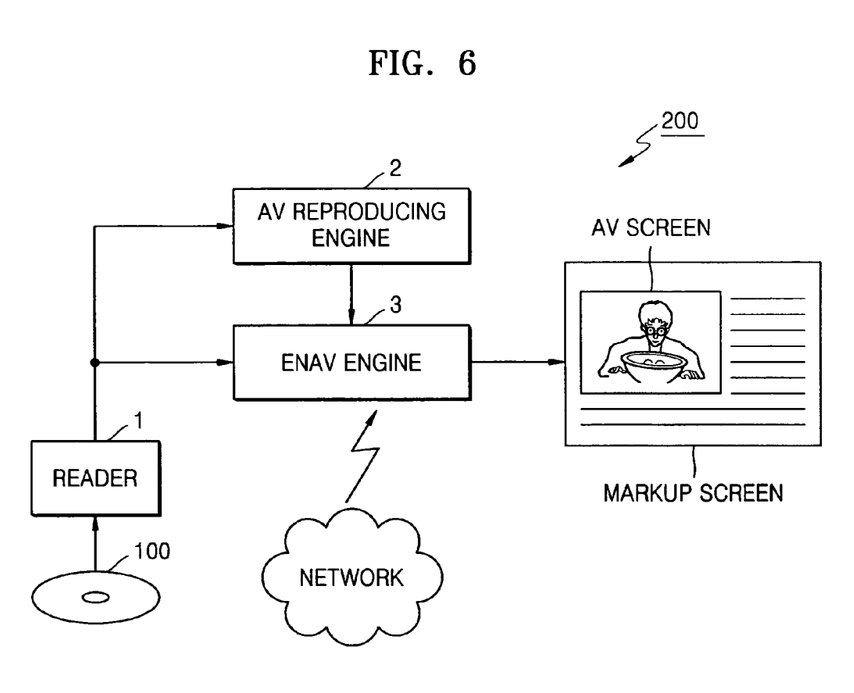
FIG. 6 is a block diagram illustrating a structure of a reproducing apparatus according to an aspect of the invention.

FIG. 6 is a block diagram illustrating a structure of the reproducing apparatus 200 according to an aspect of the invention. Referring to FIG. 6, the reproducing apparatus 200 is an apparatus supporting the video mode and the ENAV mode and includes a reader 1, an AV reproducing engine 2, and an ENAV engine 3. The reader 1 controls an optical pickup (not shown) and reads AV data and ENAV data from the disc 100, in response to a control signal from the ENAV engine 3 or the AV reproducing engine 2.

The ENAV engine 3 is an interpretation engine that interprets and executes a markup language and a script language in order to support the ENAV mode, i.e., to make a presentation of ENAV files read by the reader 1. The ENAV engine 3 further includes a variety of plug-ins. A plug-in allows various format files, which are included in or linked to a markup document, to be open. That is, the ENAV engine 3 acts as a viewer of the markup document. Also, the ENAV engine 3 according to this embodiment accesses the Internet to read ENAV data therefrom.

The AV reproducing engine 2 decodes a video title selected in the ENAV mode and transmits a decoded AV data stream to the ENAV engine 3. The ENAV engine 3 interprets the markup document, combines the AV data stream with the markup document that undergoes rendering so that the AV data stream can be displayed in a window defined in the markup document, i.e., the AV screen is embedded into the markup screen, and outputs the result of blending to the display device 100.

In particular, for seamless reproduction of the AV data, the ENAV engine 3 preloads the ENAV files to a buffer (not shown) of the ENAV engine 3 and interprets the preloaded ENAV files before the AV data is reproduced. That is, the ENAV engine 3 obtains information regarding ENAV files to be preloaded from a loading information file read from the disc 100 and then performs the preloading. A detailed description of the loading information file will be later described.

Figure 7:
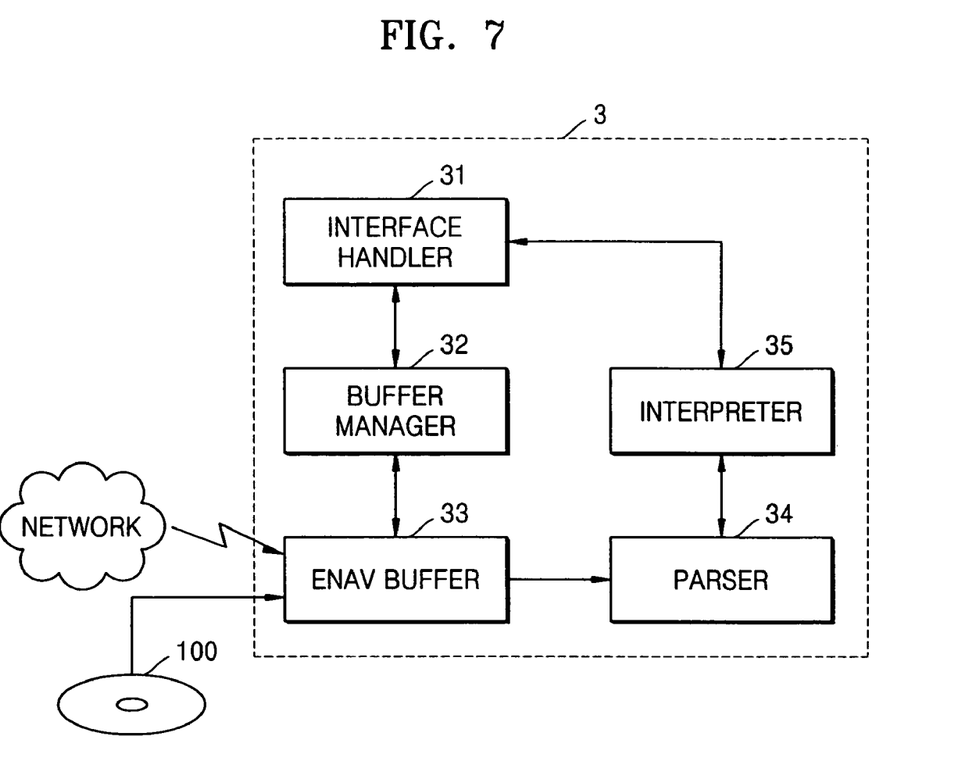
FIG. 7 is a block diagram illustrating a structure of the ENAV engine shown in FIG. 5.

FIG. 7 is a block diagram illustrating a structure of the ENAV engine 3 shown in FIG. 5. Referring to FIG. 7, the ENAV engine 3 includes an interface handler 31, a buffer manager 32, an ENAV buffer 33, a parser 34, and an interpreter 35.

The ENAV buffer 33 buffers ENAV files under the control of the buffer manager 32, and particularly, preloads the ENAV files based on a loading information file, for seamless reproduction of AV data. Further, during post loading, the ENAV buffer 33 buffers the ENAV files to be post loaded.

The parser 34 verifies the availability of a predetermined format ENAV file preloaded to the ENAV buffer 33 according to a predetermined standard and converts the format of the ENAV file so that the interpreter 35 can read the ENAV file. For instance, when the ENAV file is a markup document, the parser 34 verifies the availability of the ENAV file according to a Data Type Definition (DTD) and produces a document object model tree.

The document object model tree is produced under the following conditions: the root node of all nodes is set as a document node; all texts and elements generate nodes; and processing instructions, comments, and document type generate nodes. In the case of a style sheet, the style sheet is interpreted and style rules/selector lists are created. The style sheet allows a free setting of the style of a markup document. For example, in FIG. 7, the grammar and format of the style sheet are set according to the Cascading Style Sheet (CSS) of W3C.

The interpreter 35 receives, interprets, and executes the ENAV file from the parser 34. The interpretation and execution of the ENAV file are based on a document life cycle disclosed in Korean Patent Application No. 2002-31069 entitled "Method and Apparatus for Reproducing AV Data in Interactive Mode Using Markup Document", filed on Jun. 3, 2002, and Korean Patent Application No 2002-70014 entitled "Method and Apparatus for Reproducing AV Data in Interactive Mode Using Markup Document", filed on Nov. 12, 2002. The interface handler 31 controls an interface between the AV reproducing engine 2 and the interpreter 35. In other words, the interface handler 31 receives triggers from a user or a computer, the AV reproducing engine 2, the buffer manager 32, and the interpreter 35 and converts them into related events.

Figure 8A:
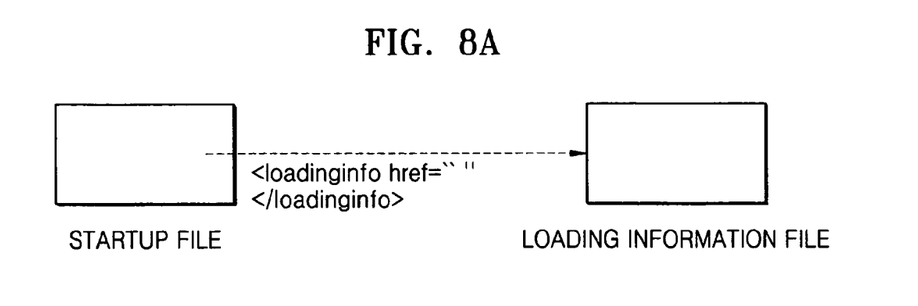
FIGS. 8A and 8B illustrate a loading information file according to an aspect of the invention.
Figure 8B:
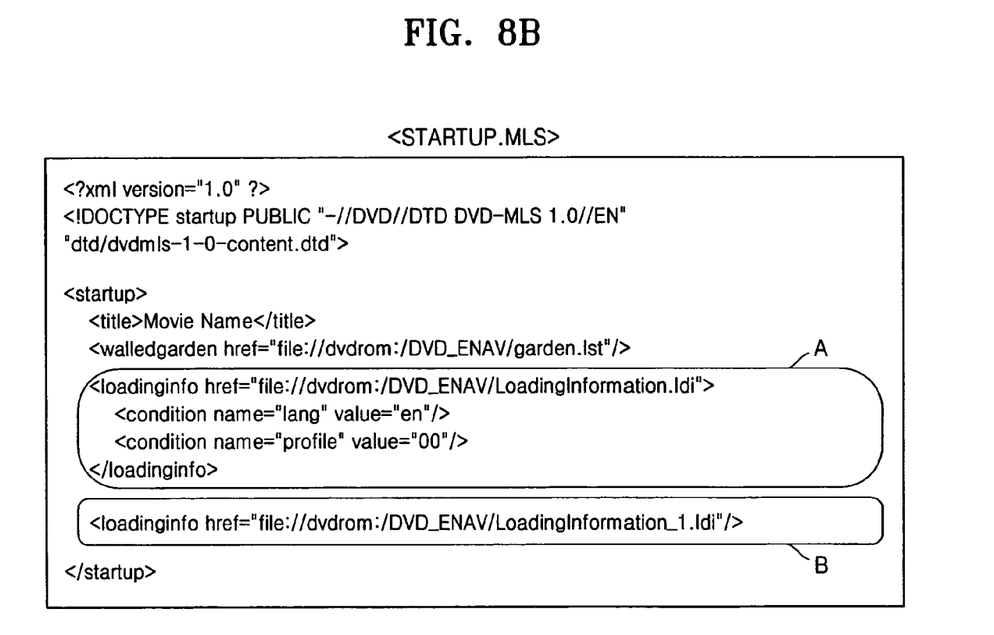

FIGS. 8A and 8B illustrate a loading information file according to an aspect of the invention. Referring to FIG. 8A, the loading information file is linked to a startup file that is first read during initialization of a disc performed when the disc 100 is inserted into the reproducing apparatus 200 or the reproducing apparatus 200 is turned on.

FIG. 8B shows an embodiment of the loading information shown in FIG. 8A. Referring to FIG. 8B, a startup file STARTUP.MLS includes an element "loadinginfo" having an attribute value specifying the location of the loading information file. In FIG. 8B, A indicates the recording position of a location information regarding the loading information file, when the name attribute and value of an element "condition" are "lang" (i.e., language) and "en" (i.e., English) and the name attribute and value of an element "condition" are "profile" (i.e., standard specification information) and "00" that is a version number, respectively. B indicates the recording position of the location information when the attributes and values of the element "condition" are different from the above description.

FIGS. 9A, 9B, 10A, and 10B illustrate a loading information file according to another aspect of the invention. The loading information file includes a list of ENAV files to be preloaded or post loaded, the ENAV files are included in an ENAV application to which the loading information file belongs. Therefore, as described with reference to FIGS. 8A and 8B, a loading information file is selected using a startup file and ENAV files are loaded into the ENAV buffer 33 based on the selected loading information file when the disc 100 is inserted into the reproducing apparatus 200 or the reproducing apparatus 200 is turned on. However, the startup file cannot be used to change ENAV applications during reproduction of AV data; therefore, a new loading file must be obtained.

Figure 9A:
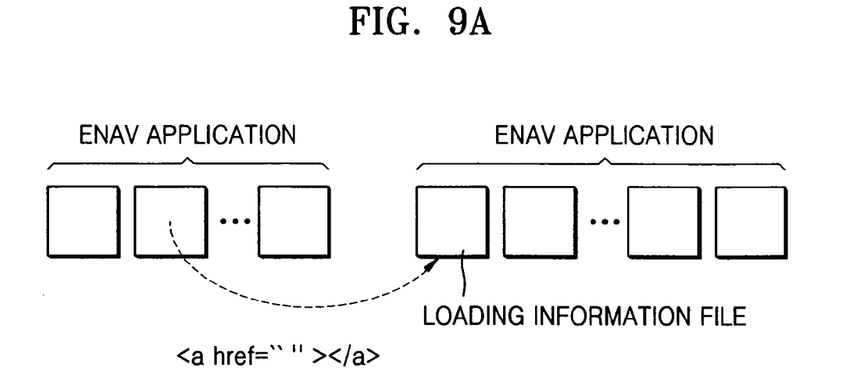
FIGS. 9A, 9B, 10A, and 10B illustrate a loading information file according to an aspect of the invention.

Referring to FIG. 9A, ENAV files belonging to an ENAV application includes an anchor element linked to a loading information file related to another ENAV application. That is, the anchor element is linked to the loading information file through a tag <a href=" ">, </a>.

Figure 9B:
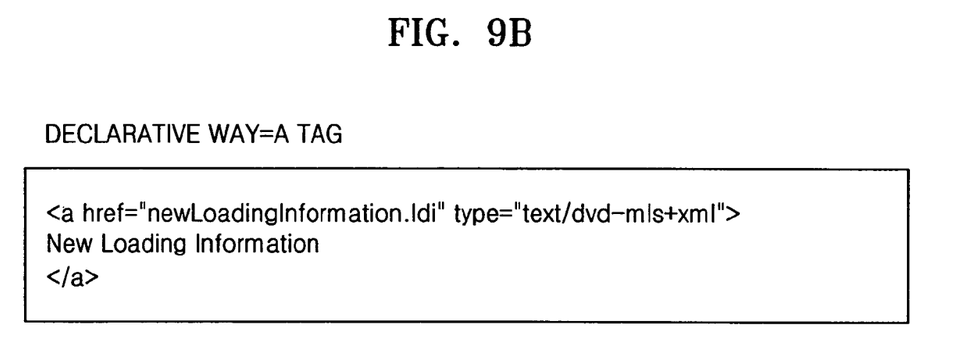

FIG. 9B illustrates an embodiment of the linkage of the loading information file belonging to another ENAV application illustrated in FIG. 9A. If a user executes a hyperlink reading "New Loading information", a new loading information file is transmitted to the parser 34.

Figure 10A:
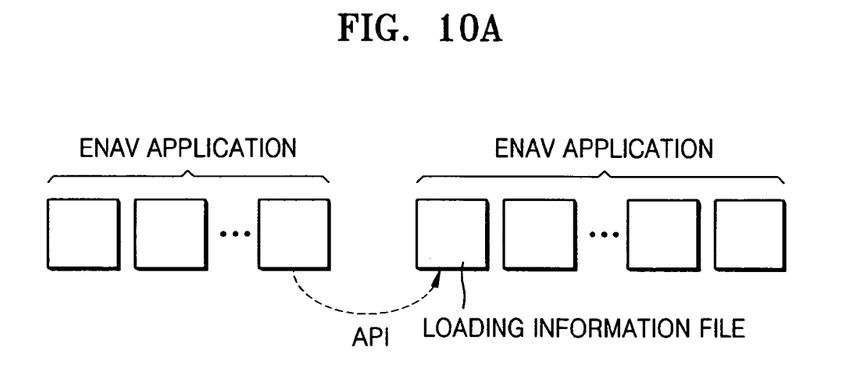

Referring to FIG. 10A, an API that calls up a loading information file related to a different ENAV application is recorded in a last ENAV file belonging to an ENAV application.

Figure 10B:
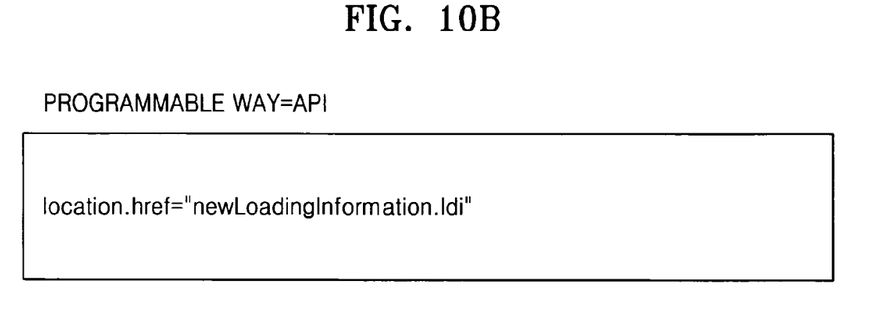

FIG. 10B illustrates an embodiment of the linkage of the loading information file belonging to another ENAV application illustrated in FIG. 10A. Referring to FIG. 10B, when a script code (API) is executed, a new loading information file is transmitted to the parser 34.

Figure 11:
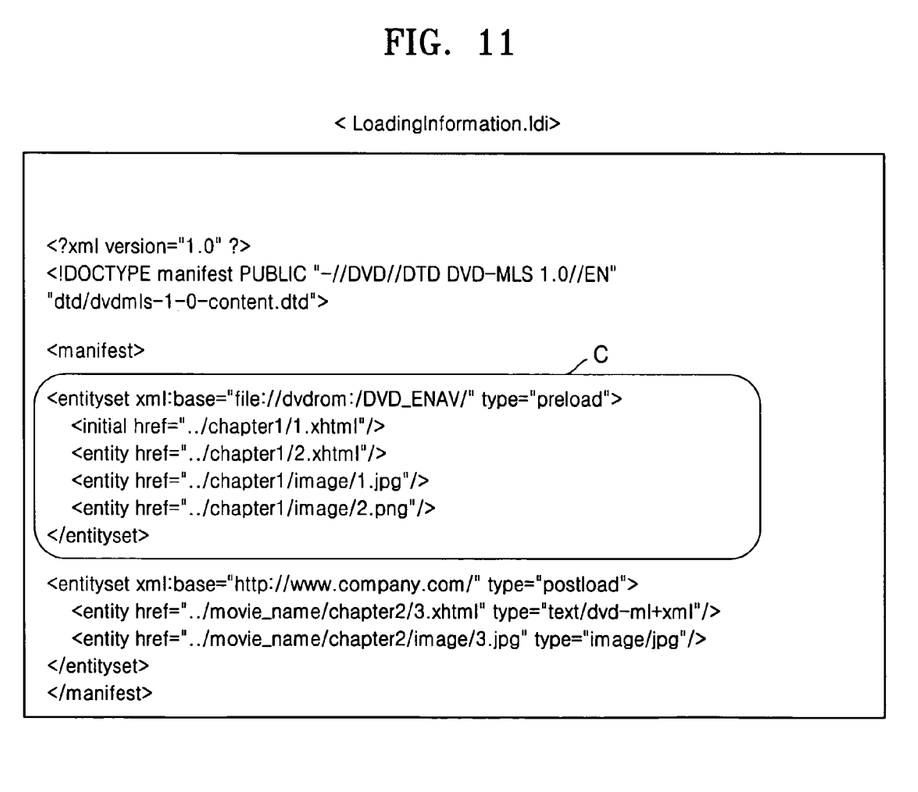
FIG. 11 illustrates a loading information file LoadingInformation.Idi according to an aspect of the invention.

FIG. 11 illustrates a loading information file LoadingInformation.Idi according to an embodiment of the present invention. Referring to FIG. 11, the loading information file includes as basic information the list of ENAV files to be preloaded to the ENAV buffer 33 before the launching of a corresponding ENAV application, and also includes the list of ENAV files to be loaded, i.e., post loaded, to the ENAV buffer 33 after the preloading of the ENAV files.

In the loading information file, an element "manifest" is used as a root element of the loading information file and two different types of an element "entityset" are present. The first element "entityset" includes the list of ENAV files to be preloaded and the second element "entityset" includes the list of ENAV files to be post loaded. The location of ENAV files is indicated with an attribute "xml:base" in each of the elements "entityset". Also, the location of each ENAV file is indicated with an element "initial" or an element "entity". The element "initial" designates a markup document that should be first executed after the preloading. It is required that the elements "initial" and "entity" include an attribute "href" that designates the location of ENAV file.

Hereinafter, a method of reproducing AV in an ENAV mode data according to the invention is described.

Figure 12:
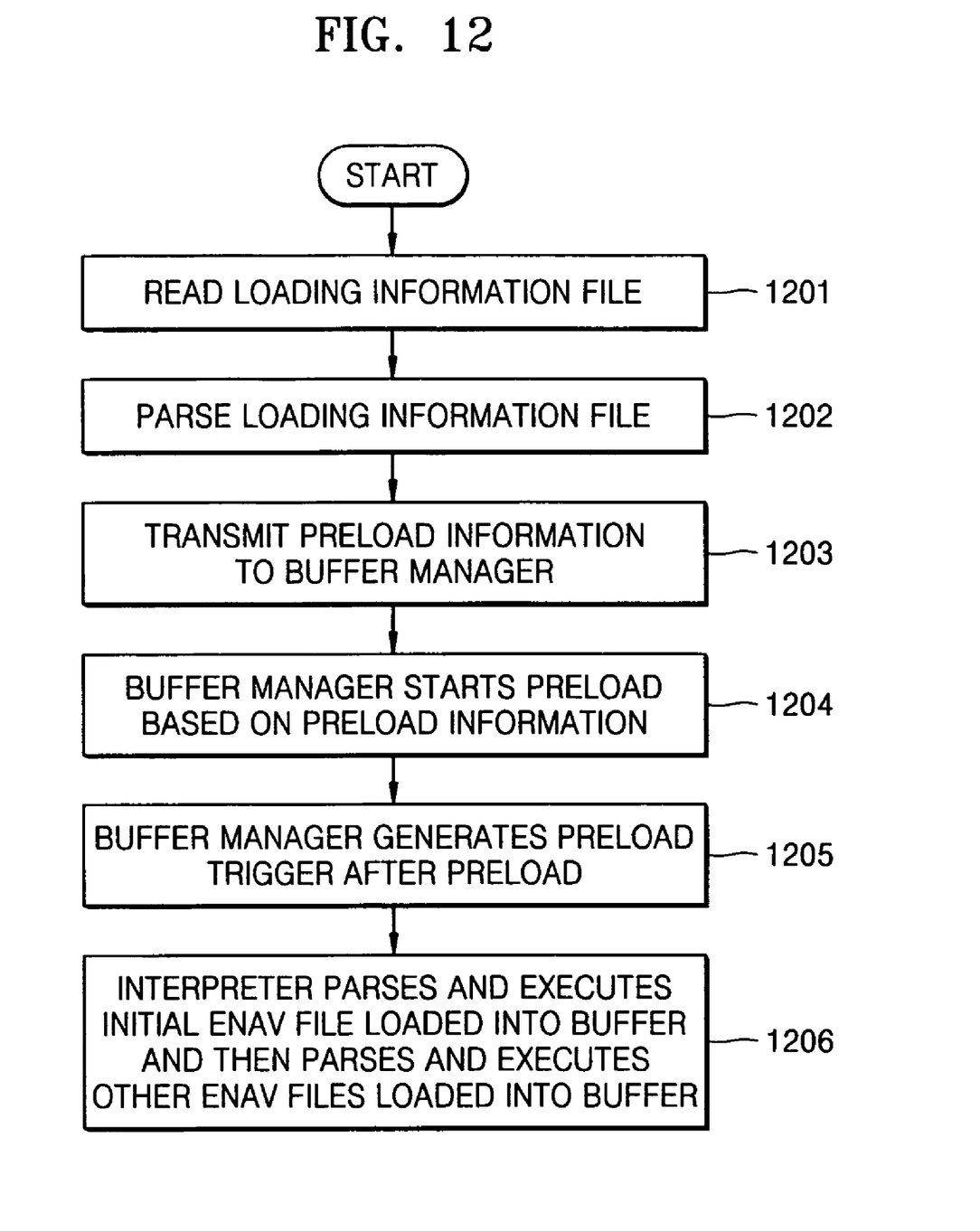
FIG. 12 is a flowchart illustrating a method of seamlessly reproducing AV data in an ENAV mode according to an aspect of the invention.

FIG. 12 is a flowchart illustrating a method of reproducing AV data according to an aspect of the invention. Referring to FIG. 12, when a loading information file is loaded to the ENAV buffer 33, as described with reference to FIGS. 7A, 7B, 8A, 8B, 9A, and 9B, the parser 34 reads the loading information file from the ENAV buffer 33 (operation 1201). The parser 34 parses the loading information file to verify its availability (operation 1202). The parser 34 transmits the verified loading information file to the interpreter 35, the interpreter 35 interprets the loading information file and sends preload information (and/or post load information), i.e., location information of ENAV file, to the interface handler 31, and the interface handler 31 sends the preload information to the buffer manager 32 (operation 1203). Then, the buffer manager 32 controls the ENAV buffer 33 according to information regarding an ENAV file to be preloaded out of the received preload information, and the ENAV buffer 33 reads the ENAV file from the disc 100 or a network (operation 1204). The buffer manager 32 determines the status of the ENAV buffer 33 so as to determine whether the preloading of the ENAV file is completed and generates and outputs a preload trigger indicating the completing of the preloading to the interface handler 31 (operation 1205). The interface handler 31 converts the preload trigger into an event indicating the completing of the preloading and sends the event to the interpreter 35.

After the preloading, ENAV files, including an initial ENAV file, which must be first reproduced by the ENAV engine 3, are loaded to the ENAV buffer 33. The initial ENAV file is a markup document designated by an element "initial". When the interpreter 35 receives the event made according to a buffer trigger indicating the completing of preloading, the interpreter 35 allows the parser 34 to read the initial ENAV file from the ENAV buffer 33 so as to determine the availability of the initial ENAV file and then receive, interpret, and execute the verified initial ENAV file (operation 1206). After the execution of the initial ENAV file, the ENAV files are also interpreted and executed using the same method.

When there are ENAV files to be post loaded after operation 1205, i.e., during reproduction of ENAV files that were preloaded and buffered, the ENAV files are continuously loaded to the ENAV buffer 33. That is, the ENAV buffer 33 buffers ENAV files received via a network under control of the buffer manager 32. After the post loading, the buffer manager 32 sets a status "allDone" indicating the status of the ENAV buffer 33 as "TRUE."

When there are no ENAV files to be post loaded after operation 1205, the ENAV manager 32 sets the status "allDone" as "TRUE" so as to indicate completing of loading of ENAV files. That is, the ENAV buffer 33 buffers ENAV files received via a network under control of the buffer manager 32. After the post loading, the buffer manager 32 sets a status "allDone" indicating the status of the ENAV buffer 33 as "TRUE". The interpreter 35 can check whether the loading of ENAV files is complete using an allDone API as a property.

A method of reproducing AV data in the interactive mode according to the invention can be performed as a computer program. Codes and code segments constituting the program can be derived by a computer programmer in this field. In addition, the method may be performed in the interactive mode by storing the program in a computer readable medium and having a computer read and execute the program. The computer readable medium may be a magnetic recording medium, an optical recording medium, or a carrier wave medium.

As described above, according to the present invention, seamless reproduction of AV data can be performed through preloading of ENAV files belonging to an ENAV application for the AV data. Further, the present invention clearly describes a process of preloading of ENAV files operation by operation, thereby enabling compatibility of preloading with respect to a reproducing apparatus and an information storage medium thereof.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium comprising:
   audio/visual data; and
   at least one Enhanced Navigation application having at least one Enhanced Navigation file, the Enhanced Navigation file being reproduced together with the audio/visual data,
   wherein the Enhanced Navigation application includes a loading information file as the Enhanced Navigation file, the loading information file includes preload information specifying a location of the Enhanced Navigation file to be buffered before reproduction of the Enhanced Navigation application.

2. The information storage medium of claim 1, wherein the loading information file further includes post load information that specifies the location of the Enhanced Navigation file to be buffered during reproduction of the Enhanced Navigation application.

3. The information storage medium of claim 1, wherein the loading information file is linked to a startup file.

4. The information storage medium of claim 1, wherein the loading information file is linked to another Enhanced Navigation file constituting another Enhanced Navigation application.

5. The information storage medium of claim 1, wherein the loading information file is designated through an application programming interface recorded in another Enhanced Navigation file constituting another Enhanced Navigation application.

6. The information storage medium of claim 1, wherein the Enhanced Navigation file is preloaded and the preloaded Enhanced Navigation file is interpreted before the audio/visual data is reproduced.

7. A method of reproducing audio/visual data in an Enhanced Navigation mode, comprising:
   reading a loading information file to verify the loading information file;
   parsing the read loading information file;
   interpreting the verified loading information file and transmitting preload information, which specifies the location of an Enhanced Navigation file to be preloaded, to a buffer manager; and
   controlling an Enhanced Navigation buffer via the buffer manager to preload Enhanced Navigation files before reproduction of a related Enhanced Navigation application, based on the received preload information.

8. The method of claim 7, wherein the controlling the Enhanced Navigation buffer further comprises generating a preload trigger after completing the preloading of the Enhanced Navigation file.

9. The method of claim 7, further comprising reproducing the related Enhanced Navigation application using buffered Enhanced Navigation files and displaying related audio/visual data in an Enhanced Navigation mode.

10. The method of claim 9, wherein the reproducing the related Enhanced Navigation application using buffered Enhanced Navigation files further comprises:
    parsing the initial Enhanced Navigation file and then parsing other Enhanced Navigation files; and
    creating a document object model tree and interpreting and executing the document object model tree according to a document life cycle.

11. The method of claim 7, wherein the interpreting the verified loading information file further comprises interpreting the loading information file, and transmitting post load information, which specifies the location of an Enhanced Navigation file to be post loaded to the buffer manager.

12. A reproducing apparatus comprising;
    a reader that reads audio/visual data from a disc
    an audio/visual reproducing engine that decodes the audio/visual data read by the reader; and
    an Enhanced Navigation engine that interprets and executes Enhanced Navigation files from the disc using the reader and allows the Enhanced Navigation files to be displayed with the audio/visual data decoded by the audio/visual reproducing engine,
    wherein the Enhanced Navigation engine preloads Enhanced Navigation files required for seamless reproduction of the audio/visual data, based on preload information recorded in a loading information file.

13. The reproducing apparatus of claim 12, wherein the Enhanced Navigation engine comprises:
    an Enhanced Navigation buffer to which the Enhanced Navigation files are preloaded;
    a buffer manager that controls the Enhanced Navigation buffer based on the preload information;
    a parser that verifies the loading information file an interpreter that interprets the preload information from the verified loading information file; and
    an interface handler that transmits the preload information from the interpreter to the buffer manager.

14. The reproducing apparatus of claim 12, wherein the buffer manager produces and outputs a preload trigger, which indicates a completion of the preloading of the Enhanced Navigation files, to the interface handler after the preloading.

15. The reproducing apparatus of claim 14, wherein the interface handler converts the preload trigger into an event and transmits the event to the interpreter.

16. The reproducing apparatus of claim 15, wherein the interpreter instructs the parser to parse an initial Enhanced Navigation file from among Enhanced Navigation files stored in the Enhanced Navigation buffer and then to store the other Enhanced Navigation files in the Enhanced Navigation buffer, the instruction occurring after receiving the event.

17. A reproducing system having an Enhanced Navigation mode to reproduce and display audio/visual data and Enhanced Navigation data from an information storage medium, the system comprising:
    a reproducing apparatus to reproduce the audio/visual data stored on the information storage medium such that an Enhanced Navigation application is preloaded from the information storage medium and an Enhanced Navigation file included in the preloaded Enhanced Navigation application is interpreted and extracted from the information storage medium.

18. The reproducing system of claim 17, wherein the reproducing apparatus further comprises a DVD-drive.

19. The reproducing system of claim 17, wherein the reproducing apparatus further comprises:

a reader to read the audio/visual data and the Enhanced Navigation data from the information storage medium;

an Enhanced Navigation reproducer to interpret the read Enhanced Navigation data and to execute a program language in order to support the Enhanced Navigation mode; and an audio/visual reproducer to decode audio/video data selected in the Enhanced Navigation mode and to transmit the decoded audio/video data to the Enhanced Navigation reproducer, wherein the Enhanced Navigation reproducer combines the audio/video data with the preloaded Enhanced Navigation data.

20. The reproducing system of claim 19, wherein the Enhanced Navigation reproducer further comprises a buffer to store the preloaded Enhanced Navigation data such that the preloaded Enhanced Navigation data is interpreted before the audio/visual data is reproduced, the buffer preloading the Enhanced Navigation data based on a loading information file for a seamless reproduction of the audio/visual data.

21. The reproducing system of claim 20, wherein during a post-loading operation, the Enhanced Navigation buffer buffers the Enhanced Navigation data to be post loaded.

22. The reproducing system of claim 21, wherein the Enhanced Navigation reproducer further comprises a buffer manager to manage preloading of the Enhanced Navigation data to be preloaded into the buffer.

23. The reproducing system of claim 19, wherein the Enhanced Navigation reproducer further comprises a plurality of plug-ins to allow for a plurality of format files to be read and viewed.

24. The reproducing system of claim 19, wherein the Enhanced Navigation reproducer is connected with a network to read and/or obtain Enhanced Navigation data therefrom.

25. The reproducing system of claim 22, wherein the Enhanced Navigation reproducer further comprises a parser to verify an availability of a predetermined format Enhanced Navigation file that is preloaded to the Enhanced Navigation buffer according to a predetermined standard and converts the format of the Enhanced Navigation file so that an interpreter reads the Enhanced Navigation file.

26. The reproducing system of claim 25, further comprising an interface handler to control an interface between the audio/visual reproducer and the interpreter, such that the interface handler receives triggers from at least one of a user or a computer, the audio/visual reproducer, the buffer manager, and the interpreter and converts the received triggers into related events.

27. The reproducing system of claim 17, wherein the Enhanced Navigation application further comprises a loading information file as the Enhanced Navigation file, the loading information file including preload information specifying a location of the Enhanced Navigation file to be buffered before reproduction of the Enhanced Navigation application.

28. The reproducing system of claim 26, wherein the loading information file further includes a list of Enhanced Navigation files to be post loaded.

29. The reproducing system of claim 27, wherein the loading information file is linked to a startup file that is read during initialization of the information storage medium when the information storage medium is inserted into the reproducing apparatus or when the reproducing apparatus is turned on.

30. The reproducing system of claim 27, wherein the startup file comprises an element having an attribute value specifying a location of the loading information file.

31. The reproducing system of claim 27, wherein the loading information file comprises a list of Enhanced Navigation files to be preloaded or post loaded, the Enhanced Navigation files are included in an Enhanced Navigation application.

32. The reproducing system of claim 27, wherein the loading information file is linked to another Enhanced Navigation file constituting another Enhanced Navigation application.

33. The reproducing system of claim 27, wherein the loading information file is designated through an application programming interface recorded in another Enhanced Navigation file constituting another Enhanced Navigation application.

34. A method of preloading Enhanced Navigation data required for seamless reproduction of audio/visual data to a buffer and reproducing the preloaded Enhanced Navigation data, the method comprising:

obtaining loading information that specifies preload information for at least one Enhanced Navigation file to be preloaded; and preloading each Enhanced Navigation file before reproducing a related Enhanced Navigation application of each Enhanced Navigation file based on the obtained preload information.

35. The method of preloading Enhanced Navigation data of claim 34, wherein the preload information is location information regarding each Enhanced Navigation file that is to be buffered before a launching of a related Enhanced Navigation application of each Enhanced Navigation file.

36. The method of preloading Enhanced Navigation data of claim 34, further comprising:

parsing the loading information to verify the loading information.

37. The method of preloading Enhanced Navigation data of claim 36, further comprising interpreting the verified loading information file and transmitting preload information which specifies the location of each Enhanced Navigation file to be preloaded, to a buffer manager.

38. The method of preloading Enhanced Navigation data of claim 37, further comprising controlling the buffer via the buffer manager to preload each Enhanced Navigation file before reproduction of a related Enhanced Navigation application of each Enhanced Navigation file, based on the received preload information.

39. The method of preloading Enhanced Navigation data of claim 34, wherein the controlling the buffer further comprises generating a preload trigger after completing the preloading of each Enhanced Navigation file.

40. The method of preloading Enhanced Navigation data of claim 34, further comprising reproducing the related Enhanced Navigation application of each Enhanced Navigation file using buffered Enhanced Navigation files and displaying related audio/visual data in an Enhanced Navigation mode.

41. The method of preloading Enhanced Navigation data of claim 35, wherein the reproducing the related Enhanced Navigation application of each Enhanced Navigation file using buffered Enhanced Navigation files further comprises:

parsing an initial Enhanced Navigation file; and creating a document object model tree and interpreting and executing the document object model tree according to a document life cycle.

42. The method of preloading Enhanced Navigation data of claim 34, further comprising loading each Enhanced Navigation file to the buffer after the preloading of each Enhanced Navigation file is complete, wherein an initial preload Enhanced Navigation file is read after the preloading of each Enhanced Navigation file is complete.

43. A computer readable medium having a computer program readable by a computer to preload Enhanced Navigation data required for seamless reproduction of audio/visual data to a buffer and to reproduce the preloaded Enhanced Navigation data, the program comprising:

reading a loading information file stored on the computer readable medium to verify the loading information file;

parsing the loading information file;

interpreting the verified loading information file and transmitting preload information, which specifies the location of an Enhanced Navigation file to be preloaded, to a buffer manager; and controlling an Enhanced Navigation buffer via the buffer manager to preload Enhanced Navigation files stored on the computer readable medium before reproduction of a related Enhanced Navigation application, based on the received preload information.

* * * * *